United States Patent [19]

Demange

[11] Patent Number: 5,145,276
[45] Date of Patent: Sep. 8, 1992

[54] SYSTEM FOR COAXIAL ASSEMBLY OF TWO BODIES OF REVOLUTION

[75] Inventor: Claude Demange, Poissy, France

[73] Assignee: Societe Nationale Industrielle et Aerospatiale, Paris, France

[21] Appl. No.: 618,690

[22] Filed: Nov. 27, 1990

[30] Foreign Application Priority Data

Dec. 27, 1989 [FR] France ............................... 89 17266

[51] Int. Cl.⁵ ............................................... F16B 7/20
[52] U.S. Cl. .................................... 403/349; 403/315; 285/360
[58] Field of Search ............... 403/203, 291, 314, 333, 403/334, 339, 340, 348, 349, 343, 350, 315; 285/360, 361, 396, 401, 402, 82

[56] References Cited

U.S. PATENT DOCUMENTS

| 1,415,157 | 5/1922 | Courchene . | |
|---|---|---|---|
| 2,387,682 | 10/1945 | Richey . | |
| 2,526,998 | 10/1950 | Davis | 403/349 X |
| 3,097,001 | 7/1963 | Le Bus, Sr. | 285/361 |
| 3,253,842 | 5/1966 | Rabe | 403/381 X |
| 3,381,979 | 5/1968 | Dudman | 285/360 X |
| 3,600,735 | 8/1971 | Jerabek | 403/348 X |
| 3,645,562 | 2/1972 | Fandetti et al. | 285/360 X |
| 3,929,343 | 12/1975 | Wanner et al. | 403/349 X |
| 4,472,163 | 9/1984 | Bottini | 403/349 X |
| 4,576,214 | 3/1986 | Preusker | 403/349 X |
| 4,756,638 | 7/1988 | Neyret | 403/349 X |

FOREIGN PATENT DOCUMENTS 3607231 9/1987 Fed. Rep. of Germany .
1014120 12/1965 United Kingdom .
2012619 8/1979 United Kingdom .

*Primary Examiner*—Peter M. Cuomo
*Attorney, Agent, or Firm*—Fisher, Christen & Sabol

[57] ABSTRACT

In a system for assembling two bodies of revolution, the first body of revolution comprises radially projecting members and the second body of revolution comprises housings adapted to receive these radial members. The system comprises, for immobilizing the two parts radially and axially, respective cooperating wedging devices on the radial members and the receiving housings and elastically deformable devices associated with one of the parts.

The wedging devices center the parts coaxially with respect to each other and hold them radially in position. The elastically deformable devices compress the wedging devices axially by wedging the radial members against the wedging devices on the receiving housings.

12 Claims, 4 Drawing Sheets

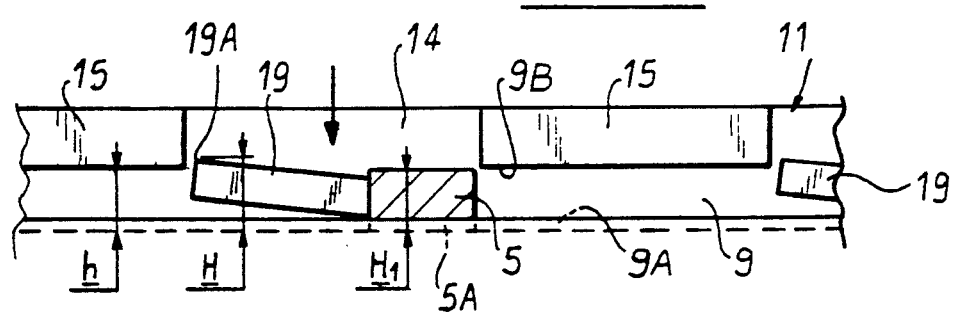
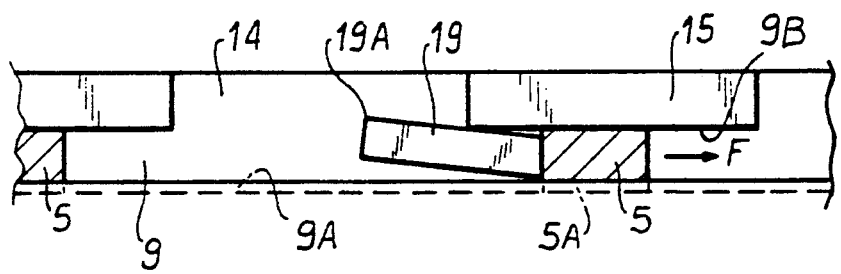
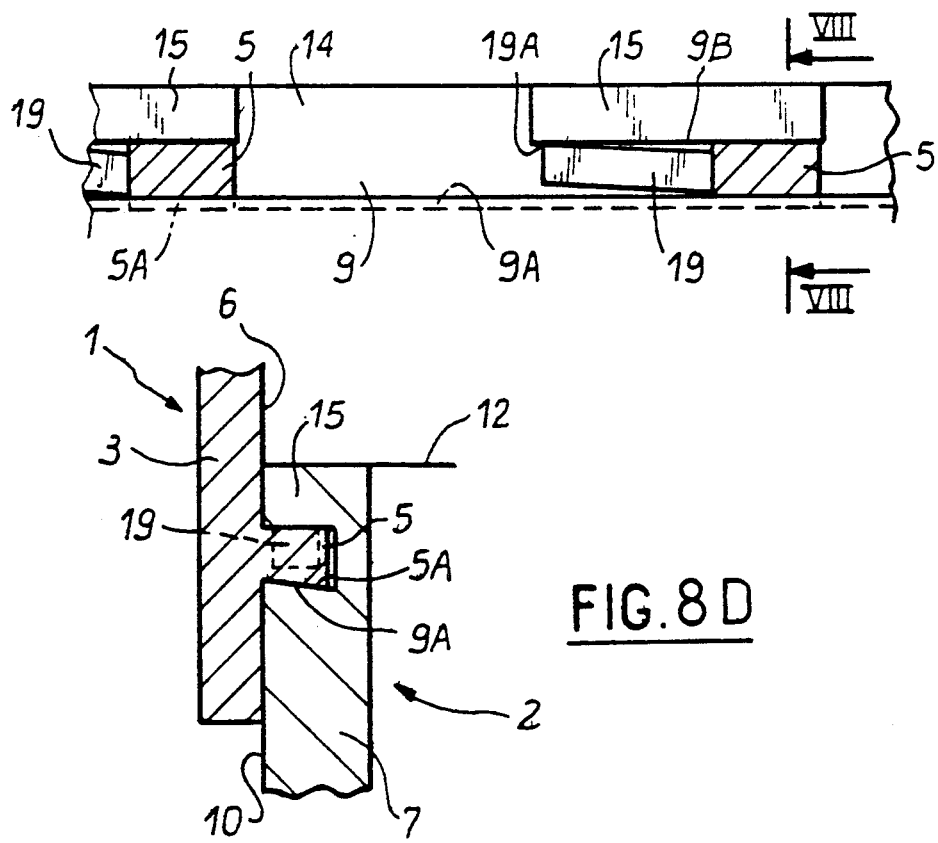

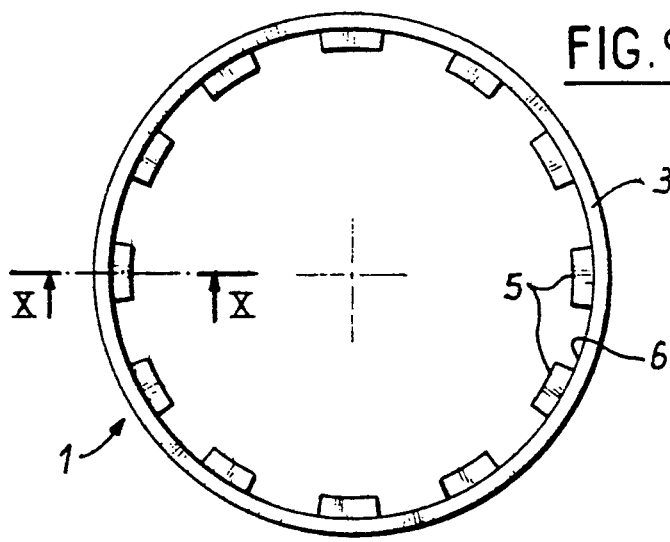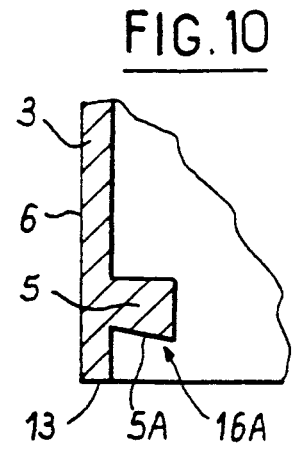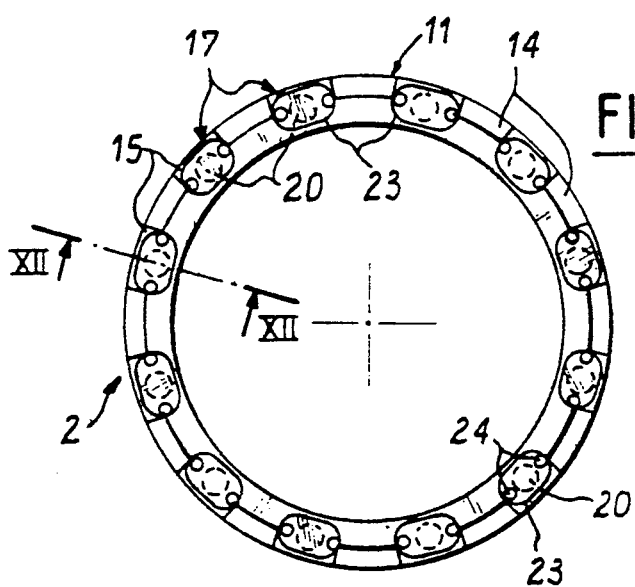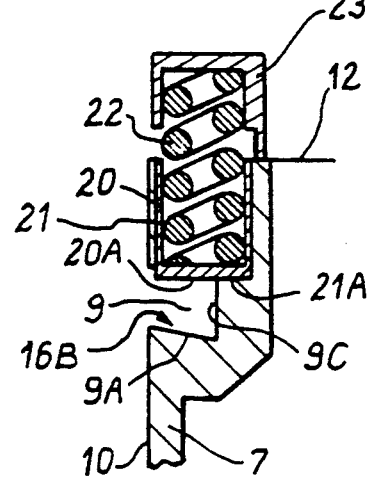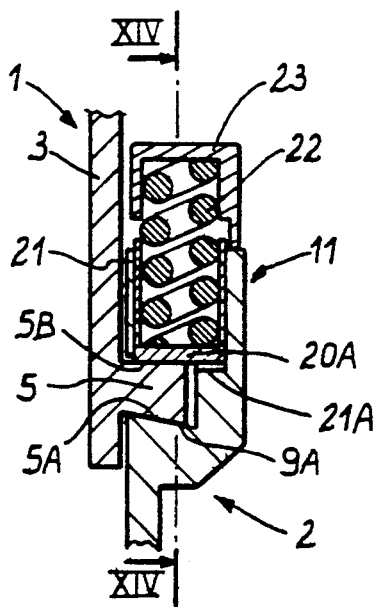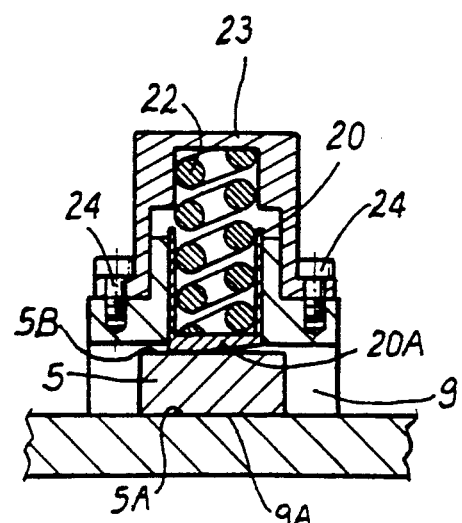

SYSTEM FOR COAXIAL ASSEMBLY OF TWO BODIES OF REVOLUTION

BACKGROUND OF THE INVENTION

1. Field of the Invention

The present invention concerns a system for coaxial assembly of two bodies of revolution.

2. Description of the Prior Art

To make a reliable connection between two bodies of revolution a plurality of bolts or screws regularly spaced around the bodies is generally employed. As a result assembly, and to a lesser degree disassembly, are relatively time-consuming operations, especially when the parts to be assembled have a large circumference requiring the use of a large number of bolts.

Apart from the various intricate operations required to fit said bolts, it is desirable to use a torque wrench so that all bolts are tightened to the same degree, and the torque wrench must be calibrated periodically. When the parts to be assembled are concerned with aerospace applications, for example structural subsystems of launch vehicles (nosecap, payload bay), the tightness must be checked using appropriate equipment, such as ultrasonic equipment, for example.

Although this type of assembly system using bolts is satisfactory with regard to immobilization of the two parts, it nevertheless has the disadvantage of being time-consuming, for the reasons already explained.

One known way to reduce the assembly time is to use an assembly system in which the connection between the two parts uses radial members projecting from one part cooperating with housings on the other part. Although this type of assembly is fast, the reliability of the immobilization of the two parts relative to each other is found to be poor because of axial and radial clearances between the aforesaid members and housings.

Consequently, this assembly system can only be used if the assembled parts are not subsequently subjected to high mechanical loads.

An object of the present invention is to exploit the speed of assembly and disassembly offered by this type of assembly system and to guarantee total immobilization of said parts when assembled together by totally eliminating such axial and radial clearances.

SUMMARY OF THE INVENTION

The present invention consists in a system for assembling two bodies of revolution the first of which comprises radially projecting members and the second of which comprises housings adapted to receive said radial members of said first part, which system comprises, for immobilizing the two parts radially and axially:

respective cooperating wedging means on said radial members and said receiving housings adapted to center said parts coaxially with respect to each other and to hold them radially in position, and elastically deformable means associated with one of said parts and adapted to compress said wedging means axially by wedging said radial members against said wedging means on said receiving housings.

The two parts are therefore perfectly immobilized because the radial clearance is eliminated by said wedging means and the axial clearance is eliminated by said elastically deformable means. In this way the two parts are quickly interlocked in a particularly effective and reliable way.

In a preferred embodiment of the invention, said wedging means constitute a conical coupling and comprise a conical bearing surface on said first body of revolution coaxial with its longitudinal axis and a complementary conical bearing surface on said second body of revolution coaxial with its longitudinal axis.

The cooperation of the conical surfaces automatically achieves a coaxial arrangement of the two bodies of revolution and the elimination of any radial clearance between them.

Advantageously, said conical bearing surface on said first part is defined by the combination of front surfaces of said radial members facing towards the second part. Preferably, said conical bearing surface on the second part is defined by the rear surface of said housings into which said radial members are adapted to be inserted.

Said radial members on the first part may be disposed in the same diametral plane and equi-angularly distributed and said housings on the second part may be formed by an annular groove whose rim between said groove and one end surface of the second part facing towards the first part may be provided with equi-angularly spaced and alternating notches and teeth.

The two parts are assembled by inserting the radial members into the notches of the rim until their conical front surfaces cooperate with the conical rear surface of the groove, after which the first part is rotated until the radial members are coincident with and under the teeth of said rim.

Preferably, said radial members project from the inside surface of a cylindrical wall of said first part and said receiving housings are formed in the outside surface of a cylindrical wall of said second part.

In a first embodiment of the invention, said elastically deformable means are provided on said first body of revolution and comprise an elastically deformable tang extending each radial member laterally and inclined relative to said member along the curvature of said body of revolution so that the height of each combination of a radial member and an elastically deformable tang is greater than the height of said receiving housings.

These tangs therefore act as deformable beams respectively built into said members and when the sets of radial members and tangs are inserted into the housings, by relative rotation of the two parts, the free end of each tang bends elastically to exert an axial force immobilizing the radial members in the housings.

Advantageously, said tangs are oriented away from the front surfaces of the members which define said conical bearing surface of the first body of revolution. The radial members and the tangs are therefore engaged progressively with the receiving groove. Also, in a plane perpendicular to said first body of revolution, the arc length of each combination of a radial member and an elastic tang is similar to that of said notches on the rim of the second body of revolution.

The arrangement of elastic tangs extending the radial members and the provision of a conical bearing surface on the forward surfaces of the latter cooperating with a complementary conical bearing surface in the receiving housings secures total immobilization of the two parts by eliminating radial and axial clearance.

In a second embodiment of the invention, said elastically deformable means are on said second body of revolution and comprise a plurality of axially displaceable pistons disposed around said second part and facing towards said receiving housings so that, after the radial members are inserted in said housings, the pistons operate against respective members to immobilize them axially.

Again the radial members are reliably and effectively immobilized in the axial direction under the teeth of the rim of the second part by eliminating the axial clearance between the two parts using said pistons.

Preferably, each piston slides in a bore in a tooth of the rim of said second part and is acted on by a compression spring disposed between said piston and a cover attached to the end surface of said rim.

Advantageously, the surface of each piston adapted to press a radial member into said annular groove is bevelled. In this way the radial members are progressively clamped in the annular groove due to the action of said springs.

The figures in the accompanying drawings will assist a clear understanding of how the invention may be implemented. In these figures, the same reference symbols denote similar, component parts.

BRIEF DESCRIPTION OF THE DRAWINGS

FIGS. 8A, 8B, and 8C show, developed in the flat, the various successive stages in the immobilization of the two parts relative to each other by means of the assembly system in accordance with the invention.

FIG. 8D is a view in cross-section on the line VIII—VIII in FIG. 8C showing the conical coupling between the two bodies of revolution.

FIG. 9 is an end view of an alternative embodiment of the first body of revolution carrying said radial members.

FIG. 10 is a view of this first part in cross-section on the line X—X in FIG. 9.

FIG. 11 is an end view of an alternative embodiment of the second part with which said elastically deformable means are associated and which is adapted to be assembled to the first part shown in FIGS. 9 and 10.

FIG. 12 is a view of said means to a larger scale and in cross-section on the line XII—XII in FIG. 11.

FIG. 13 is a view analogous to FIG. 12 showing the immobilization of the two parts when the radial members are inserted in the annular groove.

FIG. 14 is a view in cross-section on the line XIV—XIV in FIG. 13.

DETAILED DESCRIPTION OF THE PREFERRED EMBODIMENTS

Figure 1:
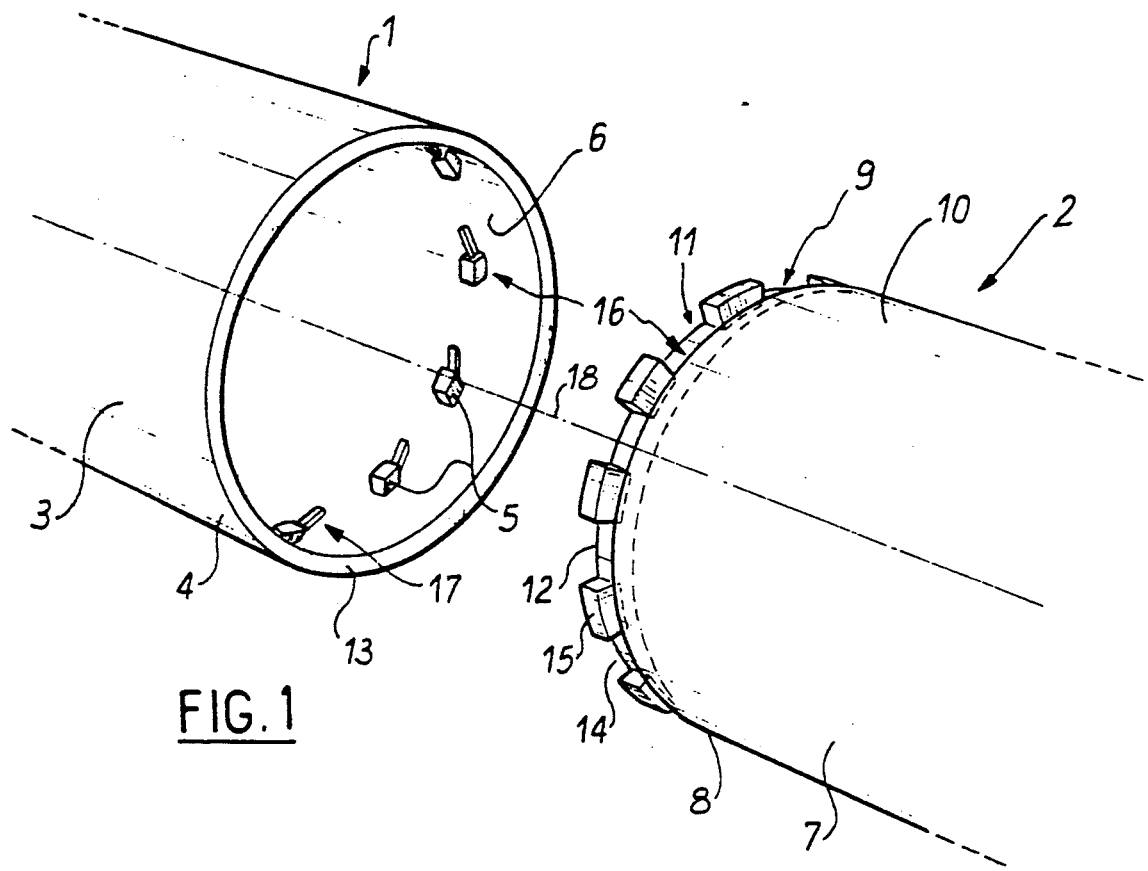
FIG. 1 is a partial view in perspective of two bodies of revolution adapted to be assembled together by means of an assembly system in accordance with the invention that they incorporate.
Figure 6:
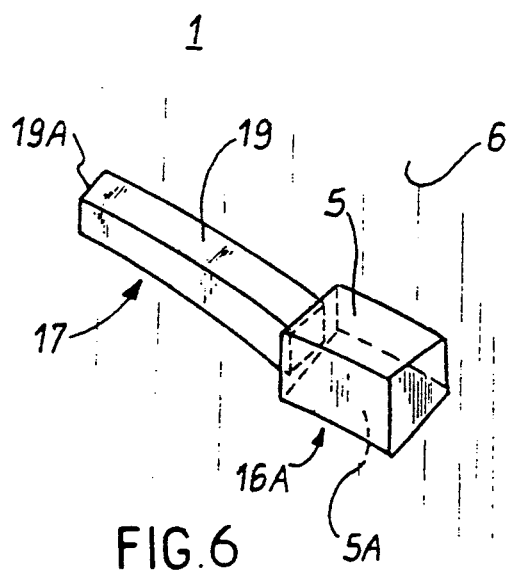
FIG. 6 is a perspective view to a larger scale of one of the radial members projecting from the first part and an associated elastically deformable tang.

Referring to FIG. 1, first and second bodies of revolution 1 and 2 are adapted to be immobilized relative to each other by means of the assembly system in accordance with the invention.

Figures 2, 4:
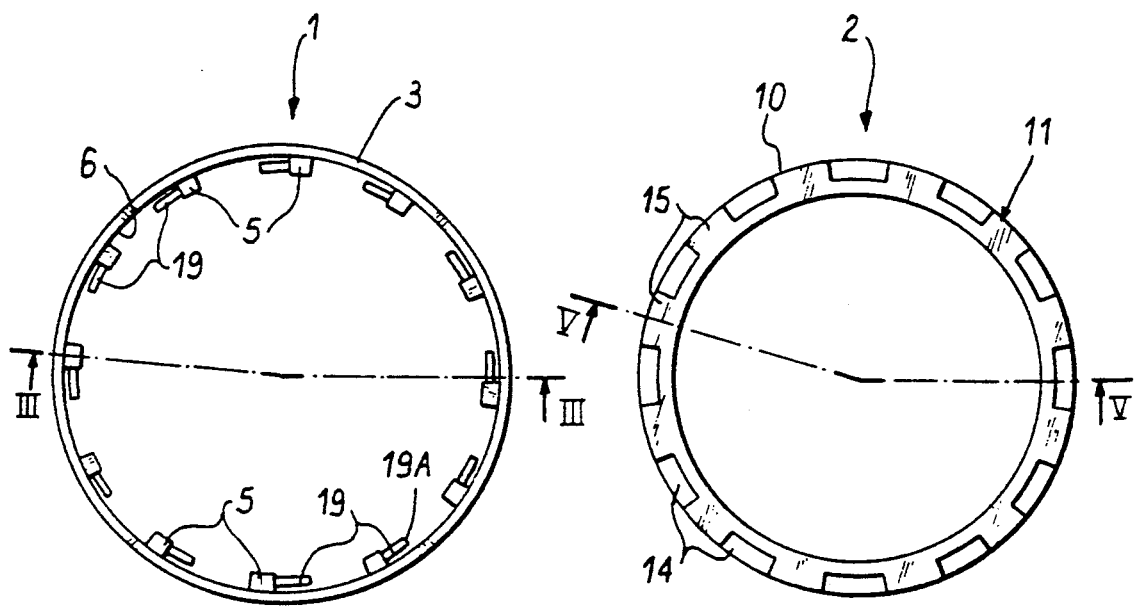
FIG. 2 is an end view of the first body of revolution showing radial members of said assembly system and associated elastically deformable means.
FIG. 4 is an end view of the second body of revolution showing receiving housings of said assembly system into which said radial members are adapted to be inserted.
Figure 3:
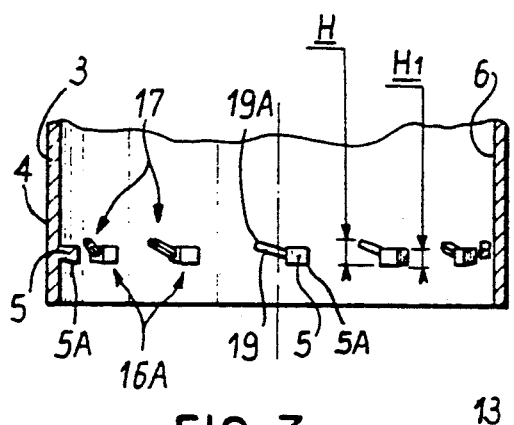
FIG. 3 is a view of the first part in cross-section on the line III—III in FIG. 2.
Figure 5:
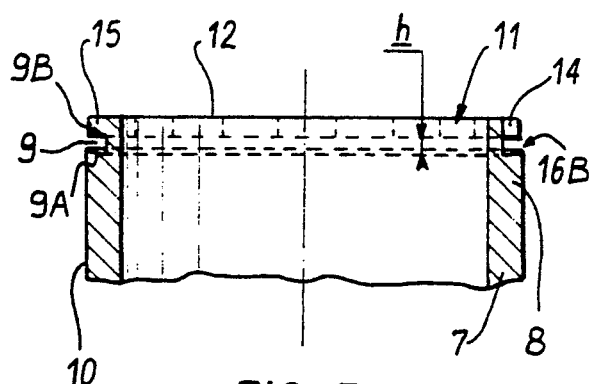
FIG. 5 is a view of the second part in cross-section on the line V—V in FIG. 4.

Referring to FIGS. 1, 2 and 3, the inside surface 6 of the cylindrical wall 3 of the first part 1 has, near its end 4, equi-angularly spaced radial members 5 projecting from said cylindrical inside surface 6. These radial members 5 are in the same diametral plane of the part 1. Referring to FIGS. 1, 4 and 5, the outside surface 10 of the cylindrical wall 7 of the second part 2 has near its end 8 an annular groove 9 in said cylindrical outside surface 10 which provides housings for receiving said radial members 5. Also, the terminal rim 11 defined between the annular groove 9 and the end surface 12 of the second part 2 has alternating notches 14 and teeth 15 which are equi-angularly spaced and form a crenellated rim 11, as seen particularly clearly in FIGS. 1 and 4. Also, the diameter of the cylindrical inside surface 6 of the part 1 is substantially the same as the diameter of the cylindrical outside surface 10 of the part 2.

The two parts 1 and 2 are assembled together by inserting the radial members 5 on the part 1 through the notches 14 of the rim 11 into the groove 9 and then rotating the part 1 relative to the part 2 so that the radial members 5 are located under the teeth 15 of the rim 11.

To immobilize the interengaged two parts radially as well as axially, the assembly system in accordance with the invention further comprises wedging means 16 on the parts 1 and 2 to center them coaxially relative to each other and to hold them in position radially, and elastically deformable means 17 associated with one of the parts and adapted to press said radial members on the first part axially into the receiving groove on the second part. The wedging means 16 and the elastically deformable means 17 guarantee effective and reliable immobilization of the assembled parts.

Figure 7:
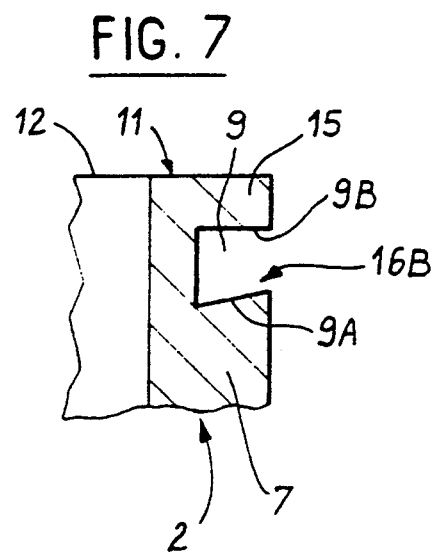
FIG. 7 is a partial view in cross-section to a larger scale of the receiving housings formed as an annular groove.

To this end the wedging means 16 are advantageously of the conical coupling type, i.e. they comprise respective complementary conical bearing surfaces 16A and 16B on the first and second parts 1 and 2. In this embodiment the conical bearing surface 16A coaxial with the longitudinal axis of the part 1 and converging towards the front surface 13 of the latter is defined by the combination of the front surfaces 5A of the radial members i.e. the surfaces facing towards the second part. The conical bearing surface 16B complementary to the bearing surface 16A and coaxial with the longitudinal axis of the part 2 is advantageously constituted by the rear surface 9A of the annular groove 9, as seen particularly clearly in FIGS. 5 and 7.

When the radial members 5 pass through the notches 14 of the rim 11 until their front surfaces 5A come into contact with the rear surface 9A of said groove 9, the two parts 1 and 2 are rigorously centered coaxially with each other along the longitudinal axis 18 defined by the assembled parts and radial clearance between the parts is eliminated. In this way, the parts 1 and 2 are immobilized against radial movement.

In the embodiment shown in FIGS. 1, 2, 3 and 6 the elastically deformable means 17 are on the first body of revolution 1 and comprise an elastically deformable tang 19 associated with each radial member 5. Each tang 19 extends the respective radial member 5 laterally and is inclined relative to said radial member, parallel to the curvature of the inside surface 6 of the wall 3 of said part 1. The arcuate tangs 19 are oriented away from the front surfaces 5A of the radial members 5 which define the conical bearing surface 16A.

Referring to FIGS. 3, 5 and 8A, the axial dimension or height H of each combination of a radial member and an elastically deformable tang, i.e. the distance between the terminal free edge 19A of the tang and the inclined front surface 5A of the radial member, is greater than the axial dimension or height h of the annular groove 9, i.e. the distance between its inclined rear surface 9A and its front surface 9B defining the teeth 15 of the rim 11. Ignoring the assembly clearance, the axial dimension or height H1 of the radial members 5 is substantially equal to the axial dimension or height h of the groove 9. The arc length of each radial member 5/elastic tang 19 combination is naturally slightly less than the arc length of the notches 14. The cross-section of the elastically deformable tangs 19 is preferably rectangular. The tangs enable axial immobilization of the radial members 5 in the groove 9, as shown in FIGS. 8A, 8B and 8C.

Referring to FIG. 8A, the radial member 5/elastic tang 19 combinations have passed through the notches 14 of the rim 11 until the inclined front surfaces 5A of the members 5 have come into contact with the rear surface 9A of the annular groove 9. This conical coupling ensures self-centering of the two parts and additionally eliminates radial clearance.

Referring to FIG. 8B, the part 1 (for example) is rotated in the direction of the arrow F so that the radial members 5 and the elastic tangs 19 extending them are progressively engaged under the surfaces 9B of the teeth 15. The elastically deformable tangs 19 come into contact with the surfaces 9B of the teeth 15 and flex of their own accord. Eventually their edge 19A is in contact with the tooth, as shown in FIG. 8C. The edges 19A of the flexed elastic tangs 19 apply an axial force to the surfaces 9B of the teeth and so press the radial members 5 against the rear surface 9A of the groove. This results in particularly effective axial immobilization of the two assembled parts 1 and 2 and eliminates axial clearance. In combination with the conical coupling immobilizing the two parts radially, this results in total interlocking of the parts 1 and 2.

Loosening of the radial members in the direction opposite to the assembly direction F is prevented by the tendency of the edges 19A to press into the surfaces of the teeth on said rim.

Abutment means not shown in the drawings are provided on the parts 1 and 2 to limit the rotation of the parts so that each radial member/elastic tang combination is located exactly under a tooth when assembly is completed. Markers may additionally be provided on the outside surfaces of the parts to indicate the locking position when they align with each other, for example.

In the alternative embodiment of the invention shown in FIGS. 9 through 14 the elastically deformable means 17 are provided on the second body of revolution 2. Referring to FIGS. 11 and 12, the elastically deformable means 17 comprise a plurality of axially displaceable pistons 20 disposed around the end surface 12 of the rim 11 in corresponding relationship to the teeth 15. The pistons 20 slide in bores 21 in the teeth 15 of the rim 11, each piston being acted on by a spring 22 disposed between the piston 20 and a cover 23 attached to the end surface 12 of the rim 11 by screws 24.

Referring to FIG. 12, the surface 20A of each piston 20 abuts on the part of the bottom 21A of the bore 21 which projects perpendicular to the bottom 9C of the annular groove 9. The rear surface 9A of the groove is identical to that in the previous embodiment and defines the conical bearing surface 16B.

In the same way as previously, the front surfaces of the radial members 5 projecting from the cylindrical inside surface 6 of the wall 3 of said part define the conical bearing surface 16A. However, they have no elastic tangs (see FIGS. 9 and 10).

The radial members 5 on the first part 1 are inserted into the annular groove 9 on the second part in exactly the same way as previously, the conical coupling centering the two parts coaxially and eliminating radial clearance. Referring to FIGS. 13 and 14, the parts are immobilized axially by the action of the axial pistons 20, which are pushed towards the groove 9 by their respective springs, against the rear surfaces 5B of the radial members 5. The front surfaces 5A of the latter are therefore pressed against the inclined rear surface 9A of the groove 9. In this position the surfaces 20A of the pistons are no longer in contact with the back part 21A of the rim 11. The surface 20A of each piston 20 is bevelled so that the radial members 5 are clamped progressively and effectively against the surface 9A of the groove 9.

I claim:

1. System for assembling and immobilizing, radially and axially, a first part and a second part each having the form of a body of revolution, said system comprising:

radially projecting members on the first part;

housings on the second part, adapted to receive said radial members of said first part;

respective cooperating wedging means integral with said radial members and said receiving housings adapted to center said first and second part coaxially with respect to each other and to hold said first and second parts radially in position; and elastically deformable means integral with one of said first and second parts and adapted to compress said wedging means axially by wedging said radial members against said wedging means on said receiving housings.

2. System according to claim 1 wherein said wedging means constitute a conical coupling and comprise a conical bearing surface on said first part coaxial with the longitudinal axis of said first part and a complementary conical bearing surface on said second part coaxial with the longitudinal axis of said second part.

3. System according to claim 2 wherein said conical bearing surface on said first part is defined by the combination of front surfaces of said radial members facing towards said second part.

4. System according to claim 2 wherein said conical bearing surface on said second part is defined by the rear surface of said housings into which said radial members are adapted to be inserted.

5. System according to claim 1 wherein said radial members on said first part are disposed in the same diametral plane and are equi-angularly distributed over the periphery of said first part, said housings on said second part are formed by an annular groove having a rim between said groove, and one end surface of said second part facing towards said first part is provided with alternating notches and teeth which are equi-angularly spaced over the periphery of said second part.

6. System according to claim 1 wherein said radial members project from the inside surface of a cylindrical wall of said first part and said receiving housings are formed in the outside surface of a cylindrical wall of said second part.

7. System according to claim 1 wherein said elastically deformable means are provided on said first part and comprise an elastically deformable tang extending each radial member laterally and inclined relative to said member along the curvature of said part so that the axial dimension of each combination of a radial member and an elastically deformable tang is greater than the axial dimension of said receiving housings.

8. System according to claim 7 wherein said tangs are oriented away from the front surfaces of the members which define said conical bearing surface of said first part.

9. System according to claim 7 wherein, in a plane perpendicular to said first part, the arc length of each combination of a radial member and an elastic tang is similar to that of said notches on the rim of said second part.

10. System according to claim 1 wherein said elastically deformable means are located on said second part and comprise a plurality of axially displaceable pistons disposed around said second part and facing towards said receiving housings so that, after said radial members are inserted in said housings, said pistons operate against respective members to immobilize them axially.

11. System according to claim 10 wherein each piston slides in a bore in a tooth of the rim of said second part and is acted on by a compression spring disposed between said piston and a cover attached to the end surface of said rim.

12. System according to claim 10 wherein the surface of each piston adapted to press a radial member into said annular groove is bevelled.

* * * * *